Patented July 6, 1948

2,444,871

UNITED STATES PATENT OFFICE 2,444,871

CHEWING GUM BASE AND METHOD

Wallace P. Cohoe, New York, N. Y., assignor to American Chicle Company, Long Island City, N. Y., a corporation of New Jersey No Drawing. Application June 23, 1944, Serial No. 541,839

8 Claims. (Cl. 99—135)

The object of my invention is to provide a chewing gum base to which has been imparted that structure which in natural chicle appears to be formed by the action of mineral constituents, such as calcium oxalate ($CaC_2O_4$, $H_2O$) and certain hard resins and which gives to a gum base incorporating chicle a characteristic chewy quality. This I accomplish by combining with a suitable mixture of gum base ingredients, one or more thermosetting resins, the latter being set by heat while finely dispersed through a gum-base carrier therefor.

The gum base will include an elastomer, and the thermosetting resin and the elastomer should be mutually compatible for thorough blending. The thermosetting resin is in fluid state when blended with the elastomer, i. e., and generally is in syrup form. It is also necessary that after the resin has set in its thoroughly distributed state with the other components of the chewing gum base, the structure formed by the thermosetting resin will be readily friable in the use of the chewing gum base, and preferably that it have a tendency to pick up some moisture.

The urea-formaldehyde resins, and the ketone-aldehyde resins are suitable for use in the practice of my invention, since these resins are characterized by polymerization at low temperatures, which temperatures are sufficiently low so as to not impair the ingredients compounded with them, some of which are sensitive to higher temperatures, such as rubber. A kettle mixing temperature of about 70° C. may be employed and after thorough mixing has taken place, the temperature may then be readily raised to the setting point of the thermosetting resins contained therein.

As an example:

Example I

| | Per cent |
|---|---|
| Depolymerized crepe rubber | 25 |
| Modified terpene condensate, having a melting point of 110–115° C., Arochem 325, made by Stroock and Wittenberg, being suitable | 20 |
| Hydrophyllic softener, for example, composed of 1½ parts lanolin, 1½ parts soy bean lecithin, and 1½ parts Carbowax 4000 | 5 |
| Modified R–26 resin produced by the Hercules Powder Company under the mark X2190–26, which is a maleic modified rosin ester. It is hydrophyllic, non-crystalline and semi-elastic, and has a softening point of 57–62° C. | 40 |
| A urea-formaldehyde resin, such as "Urac" 180–B–2749 a resin of the group of urea formaldehydes made by American Cyanamid Company being suitable | 10 |

The R–26 resin and the Urac syrup are placed in a kettle and thoroughly mixed under a temperature well below the setting point of the thermosetting content of the syrup, which is about 130° C. A suitable temperature is about 80° C. The mixing is continued under this heat and until all of the water of the syrup is absorbed by the resin and part of the water is driven out as vapor. A white mass results. The temperature of the kettle then is raised to the setting temperature of the Urac and the heat treatment is continued until the water is evaporated. Microscopic examination of the plastic mass shows that the thermosetting resin is very finely distributed throughout the R–26 resin with an approximate particle size of about .8 micron.

At this point the remaining ingredients of the gum base may be added to the kettle and the mixing continued until a homogeneous compound is produced.

A gum base thus formed may be compounded with suitable sugars and flavorings in the usual manner as a substitute for other bases commonly used for that purpose. The thermosetting resin imparts a structure to the base which makes the entire mass firm and rigid in the commercial slab or pellet of chewing gum. The final structure, however, is friable and the gum becomes soft at mouth temperature, there being a narrow temperature range between the rigid solid state and the plastic condition.

Example II

| | Per cent |
|---|---|
| Plasticized butyl methacrylate polymer which may consist of methacrylate acid ester polymer having in the ester radical 3 or more carbon atoms (about 83.5%) methyl di-hydro abietate (about 12.5%) and a softener such as candelilla wax (about 4%) | 25 |
| Hercolyn (Hercules Powder Company) methyl ester of hydrogenated abietic acid | 10 |
| Modified terpene condensate, having a melting point of 110–115° C., Arochem 325, made by Stroock and Wittenberg, being suitable | 15 |
| Modified R–26 resin produced by the Hercules Powder Company under the mark X2190–26, which is a maleic modified rosin ester. It is hydrophyllic, non-crystalline and semi-elastic, and has a softening point of 57–62° C. | 40 |
| A urea-formaldehyde resin, such as "Urac" 180–B–2749 a resin of the group of urea formaldehydes made by American Cyanamid Company being suitable | 10 |

The procedure as to Example II may be the same as that applied to Example I.

In lieu of the urea-formaldehyde resins, the ketone-aldehyde resins may be employed, such resins being prepared by the well-known acetone-caustic procedure in the formation of a syrup of the same general physical properties as the urea-formaldehyde resins above mentioned. It will also be understood that the various substitutes for depolymerized crepe rubber, balata being an example, may be employed. It will also be understood that the gum base materials may be widely varied from those specified in the examples, the latter being illustrative only.

By means of my invention, a synthetic gum base may be prepared suitable for use as a substitute for other bases in the manufactured chewing gum. The friable structure provides the properties of an easy starting chew and contributes also to the ease of manufacture. The hydrophyllic softener specified in Example I regulates solubilities and materially aids the blending of the gum base constituents.

Various extenders and buffers may be added to the chewing gum base, as will be understood without further explanation.

By means of my invention, structure is imparted to a chewing gun base through the combination with an elastomer and other normal constituents, of a thermosetting resin, which imparts to the gum base a structure which is friable but at the same time is infusible and insoluble.

Having described my invention, what I claim and desire to secure by Letters Patent is as follows:

1. A chewing gum base incorporating a thermosetting resin of the group of urea formaldehydes and ketone aldehydes in a final state of polymerization and in such proportion as to form a friable structure.

2. A composition suitable for incorporation into a chewing gum base comprising a thermosetting resin of the group of urea formaldehydes and ketone aldehydes said thermosetting resin being finely distributed through a hydrophyllic non-crystalline resin, said thermosetting resin being in a final state of polymerization, said composition of matter forming a friable structure.

3. A composition suitable for incorporation into a chewing gum base comprising a thermosetting resin of the group of urea formaldehydes and ketone aldehydes distributed throughout a semi-elastic non-crystalline and hydrophyllic resin, said thermosetting resin being in a final state of polymerization, said composition forming a friable structure.

4. A composition suitable for incorporation into a chewing gum base which consists of a thermosetting resin of the group of urea formaldehydes and ketone aldehydes said thermosetting resin being distributed through a glycol ester maleic modified rosin ester, said thermosetting resin being in a final state of polymerization.

5. A composition comprising an elastomer, a hydrophyllic softener and a thermosetting resin of the group of urea formaldehydes and ketone aldehydes, the thermosetting resin being infusible and insoluble and distributed in friable structure through the mass.

6. A method of compounding a chewing gum base material and a thermosetting resin of the group of urea formaldehydes and ketone aldehydes which consists in adding the thermosetting resin in aqueous solution to said chewing gum base material under the influence of heat below the setting temperature of the thermosetting resin, subjecting the mass to stirring until the thermosetting resin is distributed in finely divided form through the chewing gum base material, and the step of raising the temperature for setting the resin to infusible and insoluble form with evaporation of water.

7. A method of compounding a chewing gum base material and a thermosetting resin of the group of urea formaldehydes and ketone aldehydes which consists in mixing the thermosetting resin, in a fluid carrier therefor, with said chewing gum base material under the influence of heat below the setting temperature and until the resin is distributed throughout the chewing gum base material, and raising the temperature to set the resin to infusible and insoluble form.

8. A chewing gum base incorporating a thermosetting resin of the group of urea formaldehydes and ketone aldehydes in an advanced stage of polymerization rendering the resin insoluble, the resin being distributed through the mass as fine discreet particles.

WALLACE P. COHOE.

REFERENCES CITED

The following references are of record in the file of this patent:

UNITED STATES PATENTS

| Number | Name | Date |
| --- | --- | --- |
| 2,075,045 | Manson | Mar. 30, 1937 |
| 2,085,490 | Blaikie | June 29, 1937 |
| 2,197,718 | Connor | Apr. 16, 1940 |
| 2,251,070 | Schantz | July 29, 1941 |
| 2,302,664 | Carmody | Nov. 24, 1942 |